M. M. HOROWITZ.
STEERING WHEEL.
APPLICATION FILED OCT. 1, 1914.
1,125,539.
Patented Jan. 19, 1915.
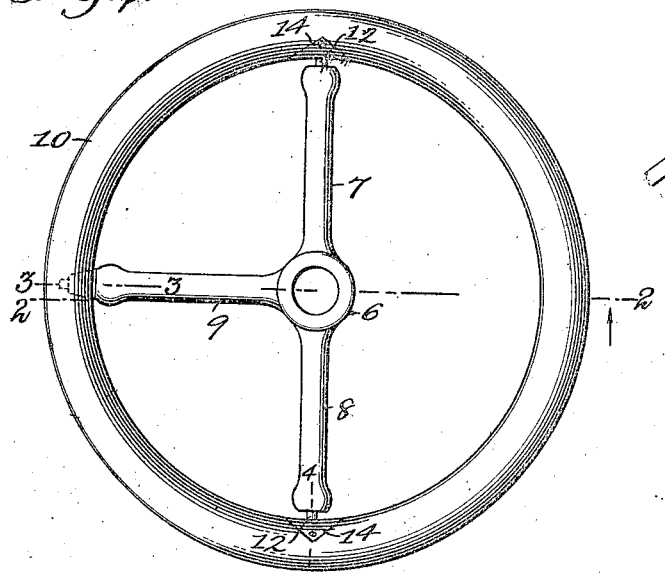
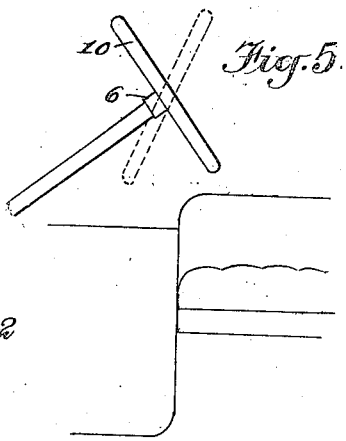
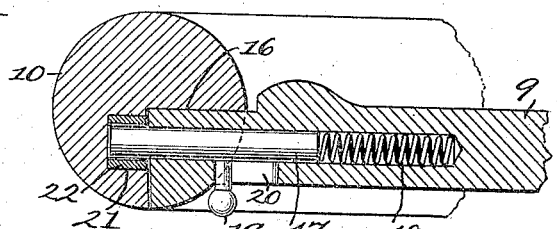
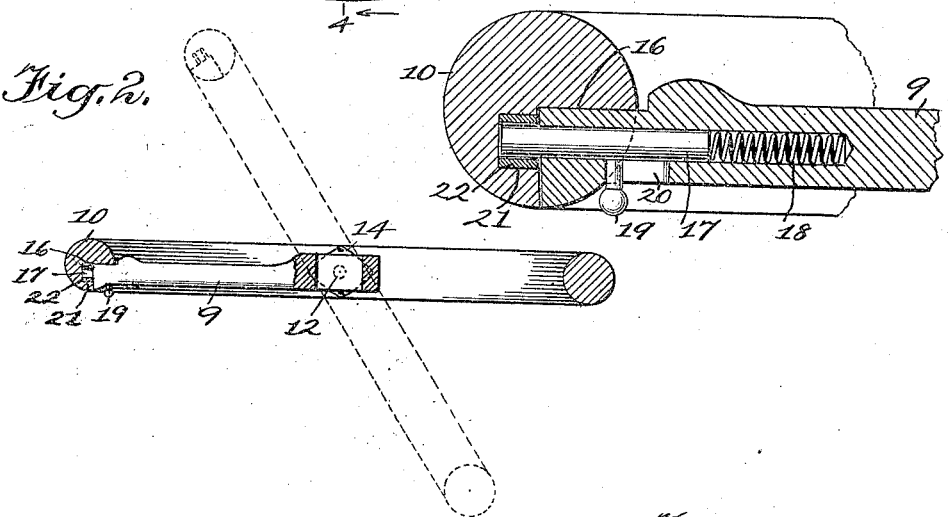
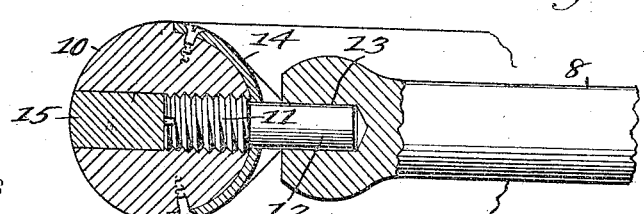
WITNESSES
INVENTOR
Morris M. Horowitz
BY
ATTORNEYS

UNITED STATES PATENT OFFICE.

MORRIS M. HOROWITZ, OF UTICA, NEW YORK.

STEERING-WHEEL.

1,125,539.  Specification of Letters Patent.  Patented Jan. 19, 1915.

Application filed October 1, 1914. Serial No. 864,406.

*To all whom it may concern:*

Be it known that I, MORRIS M. HOROWITZ, a citizen of the United States, and a resident of Utica, in the county of Oneida and State of New York, have invented certain new and useful Improvements in Steering-Wheels, of which the following is a specification.

My invention relates to automobiles, with a particular reference to the steering wheels thereof, and the main object thereof is to provide a steering wheel which is movable out of its normal relationship with the steering column and which possesses other features hereinafter specifically set forth.

The relationship usually existing between the steering wheel and the driver's seat is such that the rear edge of the wheel is in the approximate vertical plane of the forward edge of said seat, for the sake of convenience and the comfort of the driver, and this arrangement requires that the driver shall slide under the wheel, laterally of the seat, in order to reach driving position, and also prevents the driver's arising directly from driving position; further, in the present use of fore-doors, the space between the wheel and the forward edge of the rail of the driver's seat is so slight as to practically prevent the driver from getting out of the automobile on the driving side, and it was in order to overcome these defects that my invention was conceived.

My invention is fully described in the following specification, of which the accompanying drawings form a part, in which the separate parts are designated by the same reference characters in each of the views, and in which:—

Figure 1 is a top plan view of a steering wheel constructed in accordance with my invention, detached from the steering column; Fig. 2 is a section taken on the line 2—2 of Fig. 1, and showing an alternate position thereof in dotted lines; Fig. 3 is an enlarged, fragmentary, view taken on the line 3—3 of Fig. 1; Fig. 4 is a similar view taken on the line 4—4 of Fig. 1; and Fig. 5 is a side elevation showing the normal and alternate wheel positions with respect to the driver's seat, and the fore-door on the driving side of an automobile.

In the drawings forming a part of this application I have illustrated a present preferred form of embodiment of my invention, comprising a wheel formed of a hub 6 having arms 7, 8, and 9 radiating therefrom, and a rim 10 connected with the outer ends of said arms, and, in the present form, it will be noted that the arms 7 and 8 are diametrically arranged, and the arm 9 perpendicular thereto, thereby eliminating the usual fourth arm arranged diametrically of the arm 9 for reasons later set forth.

The rim 10, in the positions of the outer ends of the arms 7 and 8, is bored to receive a screw 11 having a projecting pin 12 entering a recess 13 in each of the arms 7 and 8, whereby a pivotal bearing is established between the said arms 7 and 8 and the rim 10, and I also provide a strengthening plate 14 in the position of each pin 12 on the inner side of the rim and preferably countersunk thereinto to produce a smooth finish, the outer end of the bores in said rim being plugged as shown at 15, also for the purpose of a smooth finish, this feature of the construction being clearly illustrated in Fig. 4.

The inner and under side of the rim 10, in the position of the arm 9, is recessed at 16 to receive the end of said arm, as clearly shown in Figs. 2 and 3, the outer end of said arm being so shaped as to conform to the contour of the rim, and I provide a bolt 17 slidable in said arm and normally forced outwardly thereof for a predetermined distance by means of a coil spring 18, a handle 19 operable in a slot 20 being provided for manual manipulation of said bolt, and the projecting end of the bolt 17 extends into a recess 21 in the rim preferably lined with metal, as shown at 22, to prevent wearing away the wood or other material of the rim in the vibration of the parts due to the movement of the automobile.

While driving, the wheel is in the position shown in full lines in Figs. 2 and 3, but, when it is desired to rise from driving position, all that is necessary is to retract the bolt 17 and tilt the wheel upon its pivot pins 12 into the position indicated by dotted lines in Fig. 2, and said wheel offers no obstruction to the driver's arising, nor to his leaving the automobile on the driving side, the elimination of the usual fourth arm or spoke of the wheel rendering this possible for, should such an arm be employed, it would be in the way inasmuch as it is only the rim of the wheel which tilts and not the arms or spokes thereof. When the driver resumes his seat, all that is necessary is to return the wheel rim to normal position by again retracting the bolt 17 to admit the end thereof into the rim, but I may incline the end of said bolt in the manner of a door latch in order to render the locking of the rim in normal position automatic.

Various efforts have been made to overcome the objectionable feature referred to, even to the extent of hinging the lower end of the steering column to the floor of the vehicle, but this is costly, cumbersome, complicated, and might be dangerous, whereas by my method the same result is produced without adding to the cost of this portion of a vehicle, as wheels constructed in accordance with my method may be made as cheaply, in quantity, as in the present or conventional manner; by my method there is no sacrifice of the strength of the wheel and an advantage is provided in the unobstructed grip on the rim through an arc of approximately 180 degrees of a circle, and a further advantageous feature resides in the fact that, in low racing bodies, the rim may be inclined while driving to suit the comfort of the driver and not require that he shall maintain his arms in a raised, strained, and unnatural position.

While I have shown and described a present preferred form of embodiment of my invention, it will be understood that I do not limit myself to the specific details shown and described, as many changes thereover may be made, within the scope of the following claims, without departing from the spirit of my invention, or sacrificing its advantages.

Having fully described my invention, what I claim as new, and desire to secure by Letters Patent, is:—

1. The combination of a steering column and a wheel thereon, said wheel comprising arms fixed on, and immovable with respect to, the steering column, and a bodily tiltable rim carried by said arms.

2. The combination of a steering column and a wheel thereon, said wheel comprising arms fixed on, and immovable with respect to, the steering column, and a bodily tiltable rim detachably connected to a certain arm and pivotally connected to certain others of the arms.

3. A steering wheel comprising a rigid rim, arms or spokes within the rim and upon certain of which arms or spokes said rim is pivotally supported at diametrically opposite points, and means for detachably connecting the rim to another arm or spoke to normally prevent movement of the rim on its pivots.

4. The combination of a steering column and a wheel thereon, said wheel comprising arms oppositely directed, a rim in pivotal connection with said arms and bodily tiltable with respect thereto, and means for locking said rim against movement on its pivots.

5. The combination of a steering column and a wheel thereon, said wheel comprising diametrically arranged arms, an arm in perpendicular arrangement to said first named arms, a rim in pivotal connection with said first named arms and means for detachably connecting the same with said perpendicular arm.

In testimony whereof I have signed my name to this specification in the presence of two subscribing witnesses.

MORRIS M. HOROWITZ.

Witnesses:
WILLIAM WATSON, Jr.,
WILLIAM J. WESTON.